United States Patent [19]

Ikeda

[11] Patent Number: 5,689,483
[45] Date of Patent: Nov. 18, 1997

[54] CONTROLLING SYSTEM FOR OPTICAL STORAGE APPARATUS USING PULSE WIDTH MODULATOR

[75] Inventor: Toru Ikeda, Kawasaki, Japan

[73] Assignee: Fujitsu Limited, Kawasaki, Japan

[21] Appl. No.: 718,172

[22] Filed: Sep. 19, 1996

[30] Foreign Application Priority Data

Oct. 23, 1995 [JP] Japan ..................... 7-273935

[51] Int. Cl.$^6$ ..................... G11B 17/22; G11B 7/00
[52] U.S. Cl. ............... 369/32; 369/44.29; 369/44.27
[58] Field of Search ..................... 369/32, 44.27, 369/44.28, 44.29, 44.34, 44.35, 44.36; 300/77.02, 78.04, 78.05, 78.06, 78.09, 78.12, 78.13

[56] References Cited

U.S. PATENT DOCUMENTS

| | | | |
|---|---|---|---|
| 4,783,774 | 11/1988 | Enomoto | 369/44.27 |
| 5,187,696 | 2/1993 | Ishii et al. | 369/44.29 |
| 5,566,141 | 10/1996 | Yamaguchi et al. | 369/32 |

Primary Examiner—Tan Dinh
Attorney, Agent, or Firm—Greer, Burns & Crain, Ltd.

[57] ABSTRACT

An optical storage apparatus for confirming that an optical head reaches a predetermined position by using no positional sensor, is disclosed. The optical storage apparatus includes a stopper provided in the predetermined position, a drive circuit for driving a moving unit for moving the optical head, a pulse width modulation circuit for comparing a value of current flowing across the drive circuit with a current indicating value and modulating a width of the drive pulse given to the drive circuit in accordance with a compared result, and a control circuit for giving the current indicating value to the pulse width modulation circuit, monitoring the width of the drive pulse, and thus confirming that the optical head impinges upon the stopper and stops by the monitoring, or a control circuit for giving the drive signal by which the pulse width modulation circuit outputs the drive pulse having a fixed pulse width, monitoring the value of current flowing across the drive circuit, and thus confirming that the optical head impinges upon the stopper and stops by the monitoring.

15 Claims, 16 Drawing Sheets

F I G. 4
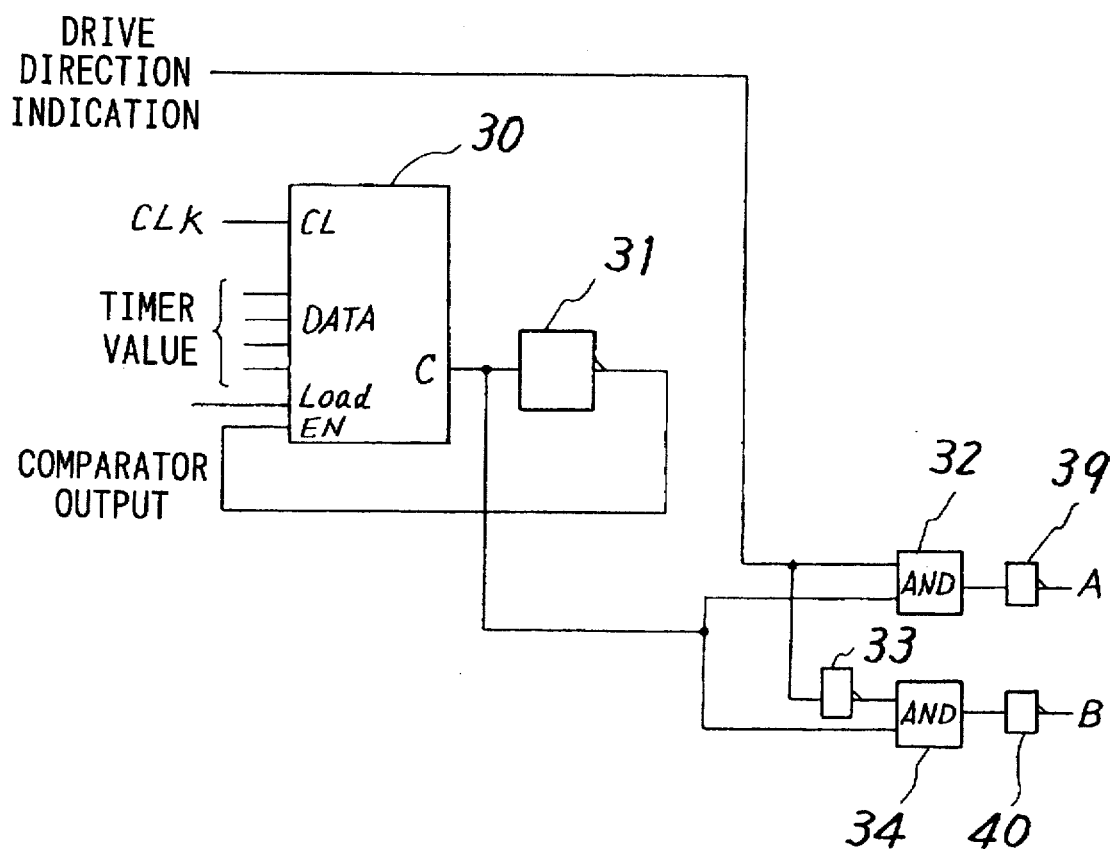

CONTROLLING SYSTEM FOR OPTICAL STORAGE APPARATUS USING PULSE WIDTH MODULATOR

BACKGROUND OF THE INVENTION

1. Field of the Invention

The present invention relates generally to an optical storage apparatus for reading data on an optical storage medium by use of an optical head and, more particularly, to an optical storage apparatus for confirming that the optical head reaches a predetermined position.

2. Description of the Related Art

An optical storage apparatus such as an optical disk apparatus, an optical card apparatus, etc. has been broadly utilized as a storage apparatus. An optical head in this kind of optical storage apparatus writes data to the optical storage medium by irradiating the optical storage medium with light beams. Also, the optical head irradiates the optical storage medium with the light beams, receives reflected light beams from the optical storage medium and thus reads the data.

In this type of optical storage apparatus, it is required that the optical head be located an outermost position or an innermost position on the optical disk in order to control a light emission quantity of the light beams of the optical head. For this purpose, it is also necessary to confirm that the optical head reaches the above predetermined position.

FIG. 16 is an explanatory diagram showing a prior art.

As illustrated in FIG. 16, an optical disk 2 is rotated by a spindle motor 1. The optical disk 2 is irradiated with laser beam from an optical head 3. Then, the laser beam reflected from the optical disk 2 is converted into electric signals by a photo detector within the optical head 3. The laser beam of the optical head is so controlled as to be emitted with an optimum power corresponding to erasing, writing and reproducing.

The electric signals converted by the photo detector are separated per frequency band. Then, signals of a high frequency component are employed for reproducing data in an RF signal generating circuit. Further, signals of a low frequency component are imparted to a track error signal generating circuit and a focus error signal generating circuit and employed for tracking control and focusing control, respectively.

A track actuator is mounted on the optical head 3. Then, the track actuator works for a short-distance movement in a track direction and works to follow a tracking high frequency component. The optical head 3 is moved in a track traverse direction on the optical disk by a voice coil motor (VCM) 4 classified as a moving coil motor. Then, the VCM 4 works for a long-distance movement of the optical head 3 and works to follow a tracking low frequency component (rotational frequency component, etc.).

In this optical disk apparatus, a light emission quantity from a laser diode of the optical head 3 is controlled. When controlling this light emission quantity, the optical head 3 is located in an outermost peripheral zone or an innermost peripheral zone exclusive of a user's zone on the optical disk 2. Then, the laser beam is emitted upon the optical disk 2 from the optical head 3, and the optical head 3 receives reflected laser beam therefrom. An intensity of emission of the laser beam is determined by measuring a level of the reflected laser beam.

The light emission is controlled when the power supply is switched ON and when replacing the optical disk 2. Herein, if located in the outermost position other than the user's zone for the purpose of controlling the light emission quantity, there must be performed such an operation that the optical head 3 is pushed against the outermost position.

For confirming a completion of this light emission control, as illustrated in FIG. 16, an optical positional sensor 6 has hitherto been provided in the outermost position. Then, an arrival and a stoppage of the optical head 3 at the outermost position are confirmed by detecting that a detection bar 5 of the optical head 3 intercepts the optical positional sensor 6.

In recent years, however, the optical disk apparatus has been required to be reduced in terms of costs and size as well. Thus, the provision of the optical positional sensor 6 entails an optical sensor and a peripheral circuit, resulting in such a problem that the costs for the device can not be reduced.

Further, the optical disk apparatus is also required to be downsized as small as a floppy disk apparatus. If provided with the optical positional sensor, however, a thin-type optical disk apparatus is hard to actualize. Moreover, the provision of the same sensor might probably bring about an increase in size of the apparatus.

SUMMARY OF THE INVENTION

It is a primary object of the present invention to provide an optical storage apparatus capable of detecting that an optical head reaches a predetermined position by no-using a positional sensor.

It is another object of the present invention to provide an optical storage apparatus capable of reducing costs for the apparatus.

It is still another object of the present invention to provide an optical storage apparatus capable of attaining downsizing of the apparatus.

To accomplish the objects given above, according to a first aspect of the present invention, an optical storage apparatus confirms that an optical head for reading data on an optical storage medium reaches a predetermined position. The optical storage apparatus comprises a stopper provided in the predetermined position, a moving unit for moving the optical head in such a direction as to traverse a track on the optical storage medium, and a drive circuit for driving the moving unit. The optical storage apparatus further comprises a pulse width modulation circuit for comparing a value of current flowing across the drive circuit with a current indicating value and modulating a width of the drive pulse given to the drive circuit in accordance with a compared result, and a control circuit for giving the current indicating value to the pulse width modulation circuit, detecting the width of the drive pulse, and thus confirming that the optical head impinges upon the stopper and stops.

An operation of the apparatus according to the first aspect of the invention will be explained. The moving unit is driven by a constant current, whereby a moving velocity of the optical head increases. Therefore, a counter electromotive voltage is generated at both ends of a coil of he moving unit by dint of this velocity. With this generation, a voltage applied on both ends of the coil decreases, and a current flowing across the coil decreases.

On the other hand, in a current feedback pulse width modulation circuit, the control is performed so that a drive current is made constant. Therefore, when the current flowing across both ends of the coil decreases, a drive pulse width increases.

When the optical head impinges upon the stopper, the optical head comes to its kinetic stoppage. Hence, the moving velocity of the optical head is zeroed. This makes the counter electromotive force zero, and the voltage applied on both ends of the coil increases. Consequently, the drive pulse width is narrowed. It is feasible to confirm that the optical head impinges upon the stopper and stops by monitoring a variation in the drive pulse width.

Further, according to a second aspect of the present invention, an optical storage apparatus confirms that an optical head for reading data on an optical storage medium reaches a predetermined position. The optical storage apparatus comprises a stopper provided in the predetermined position, a moving unit for moving the optical head in such a direction as to traverse a track on said optical storage medium, a drive circuit for driving the moving unit, and a comparing circuit for comparing a value of current flowing across the drive circuit with a current indicating value. The optical storage apparatus further comprises a pulse width modulation circuit for modulating a width of the drive pulse given to the drive circuit in accordance with a control signal, a switch circuit for switching an input of the control signal to the pulse width modulation circuit over to an output of the comparing circuit and a drive signal as well, and a control circuit for switch-controlling the switch circuit, giving the drive signal by which the pulse width modulation circuit outputs the drive pulse having a fixed pulse width, detecting the value of current flowing across the drive circuit, and thus confirming that the optical head impinges upon the stopper and stops.

An operation of the apparatus according to the second aspect of the invention will be explained. A drive signal having a fixed pulse width is given from the control circuit. A pulse width modulation circuit thereby becomes a voltage drive pulse width modulation circuit. Accordingly, the drive pulse with the fixed width is outputted. The optical head is thereby moved. The counter electromotive voltage is thereby generated at both ends of the coil of the moving unit. As a result, the voltage applied on both ends of the coils decreases, and the current flowing across the coil is reduced.

When the optical head impinges upon the stopper, the optical head comes to its kinetic stoppage. Hence, the moving velocity of the optical head is zeroed. This makes the counter electromotive force zero, and the voltage applied on both ends of the coil rises. Therefore, the current flowing across the coil increases. It is feasible to confirm that the optical head impinges upon the stopper and stops by monitoring a variation in the current value of current flowing across the coil.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 4 is a circuit diagram of a PWM pulse generating circuit of FIG. 3;

DETAILED DESCRIPTION OF THE PREFERRED EMBODIMENTS

Figure 1A:
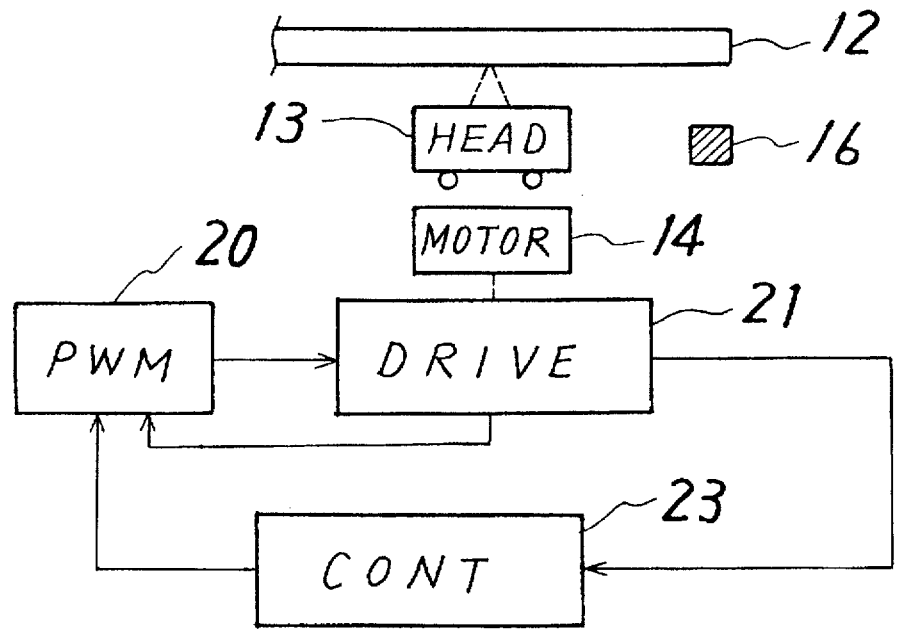
FIGS. 1A and 1B are diagrams showing the principle of the present invention.
Figure 1B:
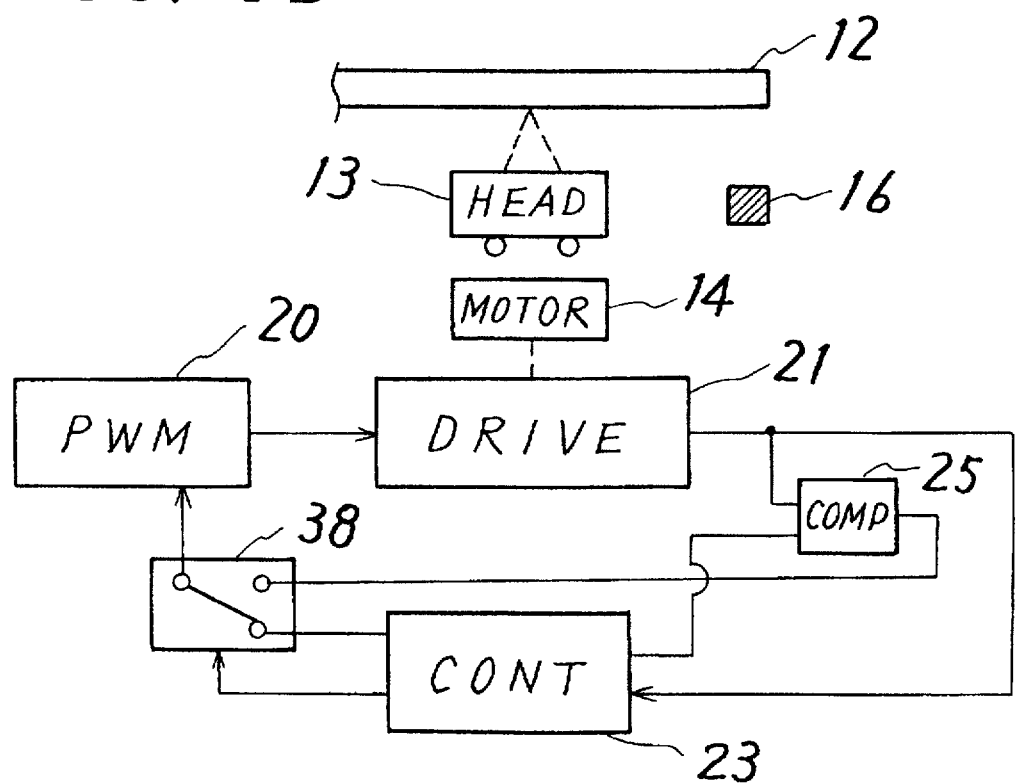

FIGS. 1A and 1B are diagrams showing the principle of the present invention.

As illustrated in FIG. 1A, an optical storage apparatus includes an optical disk 12 and an optical head for reading data from the optical disk 12. This optical storage apparatus has a construction for confirming that the optical head 13 reaches a predetermined position.

This optical storage apparatus includes a stopper 16 provided in a predetermined position where the optical head 13 should stop, and a moving motor 14 for moving the optical head 13 in such a direction as to traverse tracks on the optical disk 12. The optical storage apparatus also includes a drive circuit 21 for driving the moving motor 14.

Then, a current feedback pulse width modulation circuit 20 compares a value of current flowing across the drive circuit 21 with a current indication value and, in accordance with a result of this comparison, modulates a width of a drive pulse given to the drive circuit 21. A control circuit 23 gives the current indication value, monitors the width of the drive pulse of the current feedback pulse width modulation circuit 20, and confirms that the optical head 13 impinges upon the stopper 16 and thus stops by the monitoring.

The moving motor 14 is constructed of a moving coil linear motor. That is, the optical head 13 is provided with a motor coil. This moving motor 14 is driven by the electric current having a fixed value, whereby the optical head 13 is accelerated.

Therefore, counter electromotive voltages are generated at both ends of the coil of the moving motor 14 by dint of that velocity. The voltages applied on both ends of the coil are thereby reduced, and the current flowing through the coil decreases.

On the other hand, the current feedback pulse width modulation circuit 20 performs the control to set the drive current at a fixed level. Therefore, when the moving velocity of the optical head 13 increases, the drive pulse width of the current feedback pulse width modulation circuit 20 increases.

When the optical head 13 impinges upon the stopper 16, and, upon a kinetic stoppage, the velocity is zeroed. The counter electromotive force is thereby zeroed, and the voltages applied on the both ends of the coil of the motor 14 increase. Hence, the drive pulse width is narrowed. It is feasible to confirm that the optical head 13 impinges upon the stopper and thus stops by monitoring that drive pulse width.

Next, as shown in FIG. 1B, the optical storage apparatus includes the optical disk 12 and the optical head 13 for reading the data from the optical disk 12. This optical storage apparatus confirms that the optical head reaches the predetermined position and, for this purpose, has the following construction.

The optical storage apparatus comprises the stopper 16 provided in a predetermined position, the moving motor 14 for moving the optical head 13 in such a direction as to traverse the tracks on the optical storage medium 12. The optical storage apparatus also comprises the drive circuit 21 for driving the moving motor 14.

Then, a comparing circuit 25 compares a value of the current flowing across the drive circuit 21 with a current indication value. The pulse width modulation circuit 20 modulates a width of the drive pulse given to the drive circuit 21 in accordance with a control signal. A switch circuit 38 switches an input of the control signal to the pulse width modulation circuit 20 over to an output of the comparing circuit 25 and to a drive signal.

The control circuit 23 switch-controls the switch circuit 38 and imparts a drive signal for making uniform the width of the drive pulse of the pulse width modulation circuit 20. Then, the control circuit 23 monitors a value of the current flowing across the drive circuit 21 and confirms that the optical head 13 impinges upon the stopper 16 and thus stops by monitoring the value of the current flow.

An operation in this mode will be explained. Given from the control circuit 23 is the drive signal having the uniform pulse width. The pulse width modulation circuit 20 thereby operates as a voltage drive pulse width modulation circuit and therefore outputs the drive pulse with the uniform width. The optical head 13 is moved by the moving motor 14.

The moving motor 14 is constructed of a moving coil linear motor. The counter electromotive voltages are therefore generated at both ends of the coil of the moving motor 14 by dint of that moving velocity. This reduces the voltages applied on the both ends of the coil, with the result that the current flowing cross the coil is decreased.

When the optical head 13 impinges upon the stopper 16, and, upon a kinetic stoppage, the velocity is zeroed. The counter electromotive force is thereby zeroed, and the voltages applied on the both ends of the coil increase. Hence, the current flowing across the coil augments. It is feasible to confirm that the optical head 13 impinges upon the stopper and thus stops by monitoring the value of current flowing across the coil.

Figure 2:
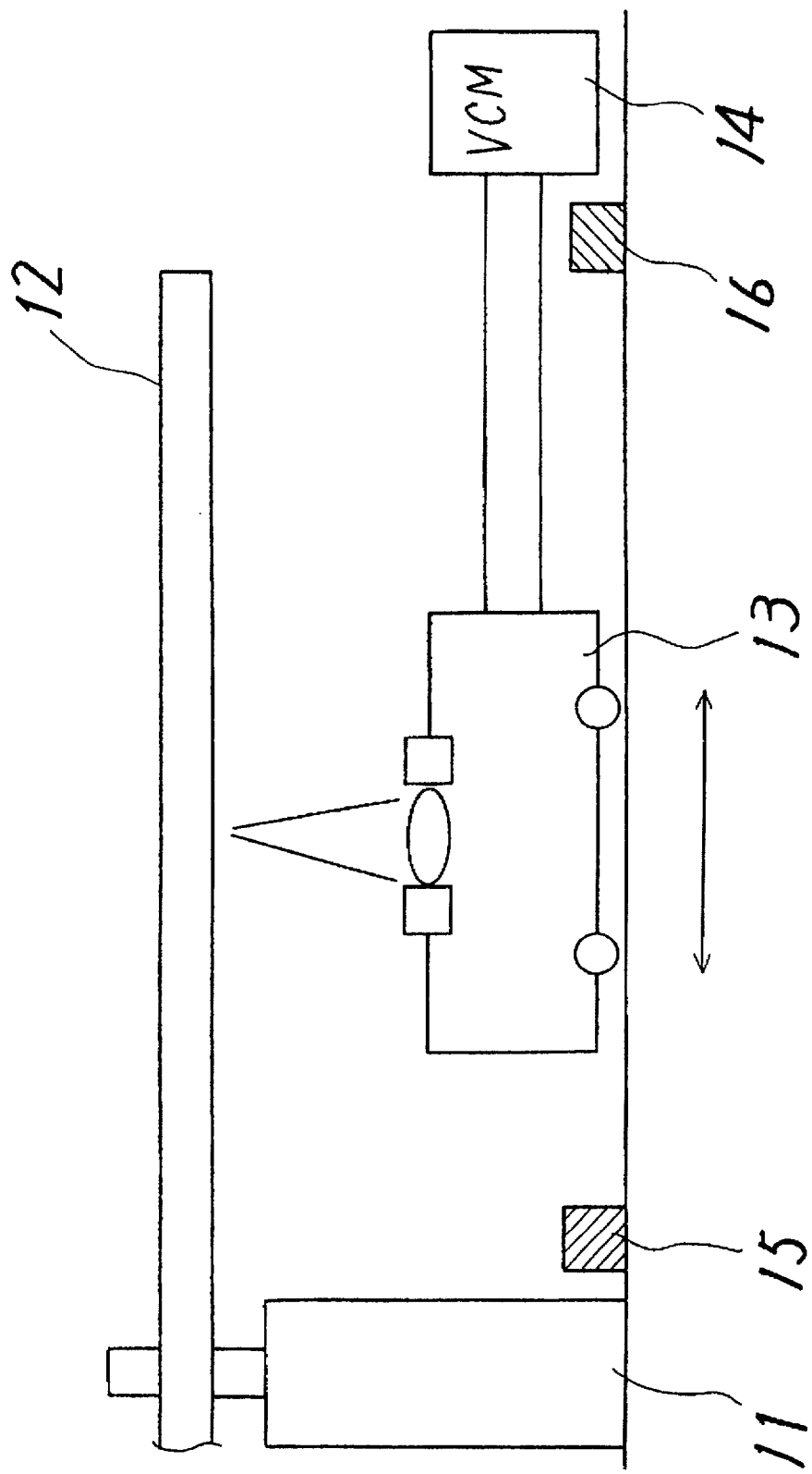
FIG. 2 is a diagram showing a construction of one embodiment of the present invention.

FIG. 2 is a diagram illustrating a construction of one embodiment of the present invention.

As shown in FIG. 2, the optical disk 12 is rotated by a spindle motor 11. The optical head 13 irradiates the optical disk with laser beam. Herein, the optical head 13 is separated into a fixed unit and a movable unit. Then, the fixed unit is mounted with a laser light source and a photo detector, while the movable unit is mounted with a lens, a track actuator and a focus actuator. Herein, only the movable unit of the optical head 13 is illustrated.

The optical head 13 is moved by a voice coil motor (VCM) 14 in a track traversing direction on the optical disk 12. The VCM 14 is classified as a linear motor, and a motor coil is incorporated into the optical head 13.

On a moving path for the optical head 13, an inner stopper 15 is provided in a position corresponding to an innermost peripheral position on the optical disk 12. Further, on the moving path for the optical head 13, an outer stopper 16 is provided in a position corresponding to an outermost peripheral position on the optical disk 12.

The two stoppers 15, 16 are composed of elastic members such as rubbers. Herein, when controlling an emission of light, the optical head 13 is pushed against the outer stopper 16 and thereby stopped.

Figure 3:
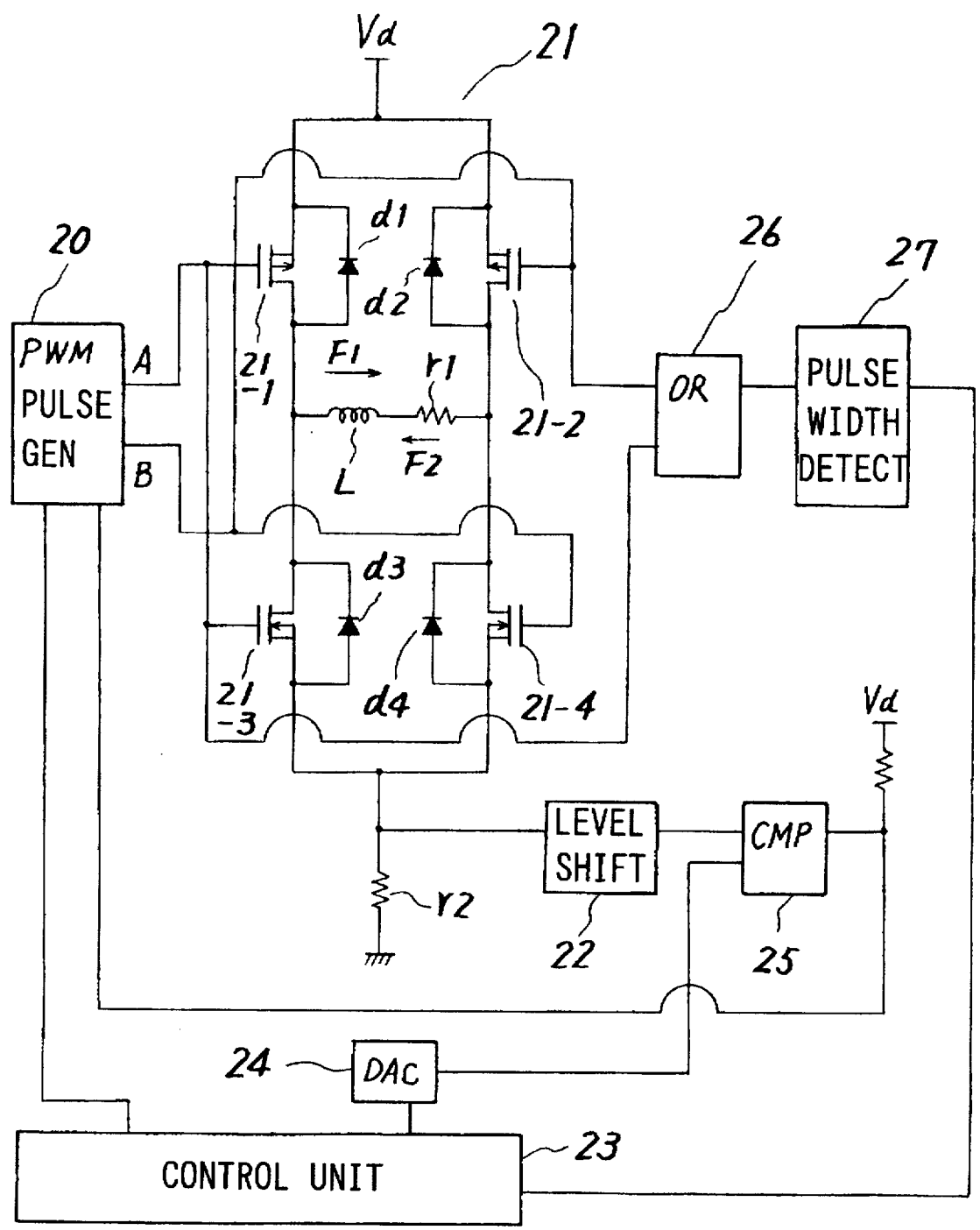
FIG. 3 is a block diagram illustrating a first embodiment of the present invention.
Figure 5:
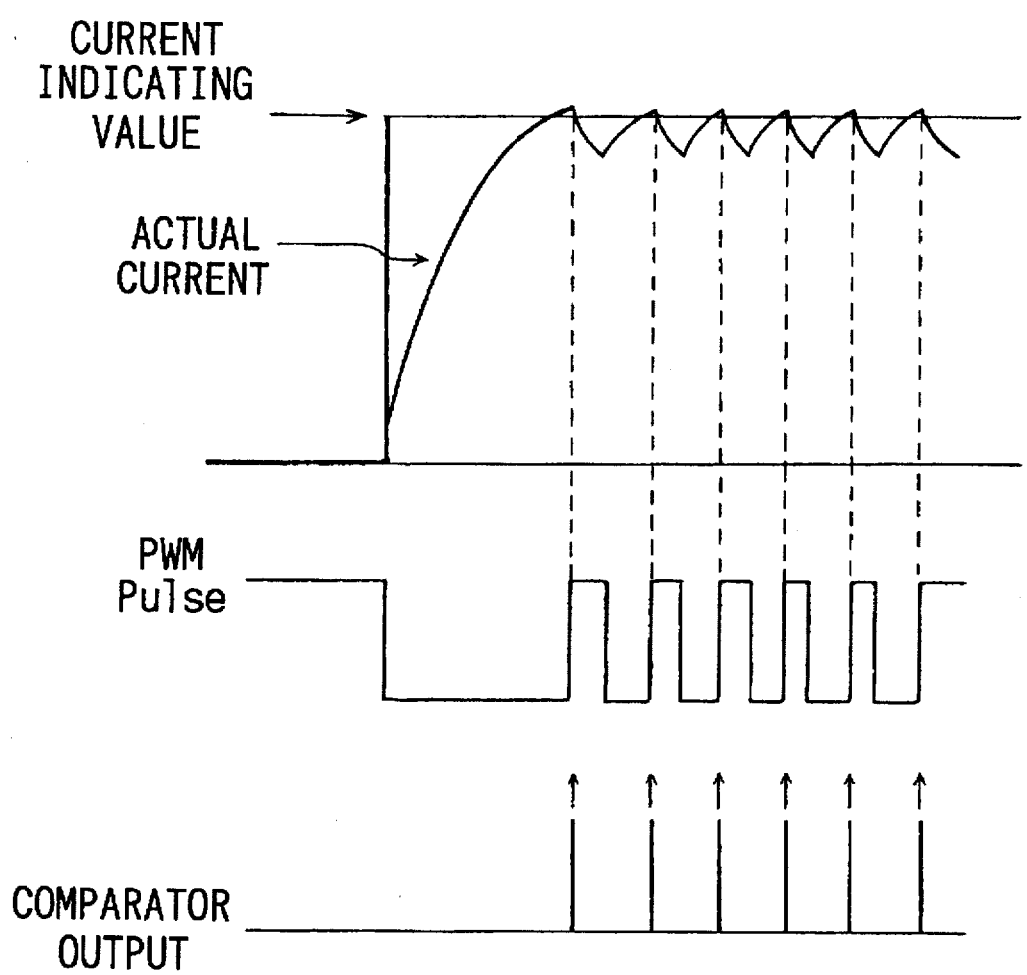
FIG. 5 is a diagram of assistance in explaining an operation of a current feedback PWM control circuit of FIG. 3.
Figure 6:
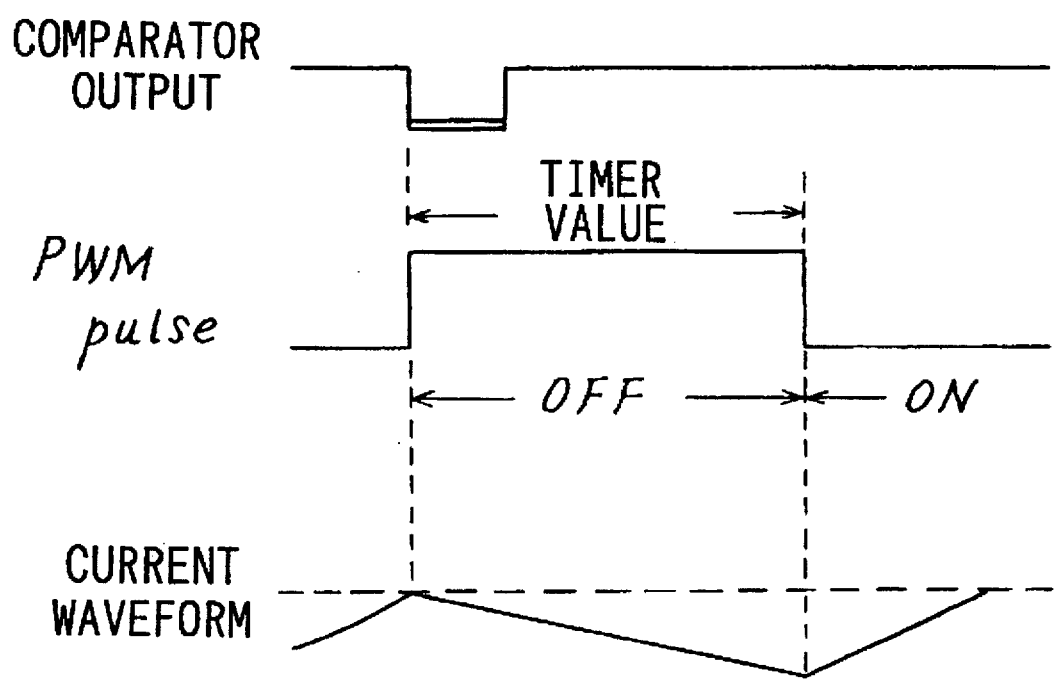
FIG. 6 is a diagram of assistance in explaining a PWM pulse of FIG. 4.
Figure 7:
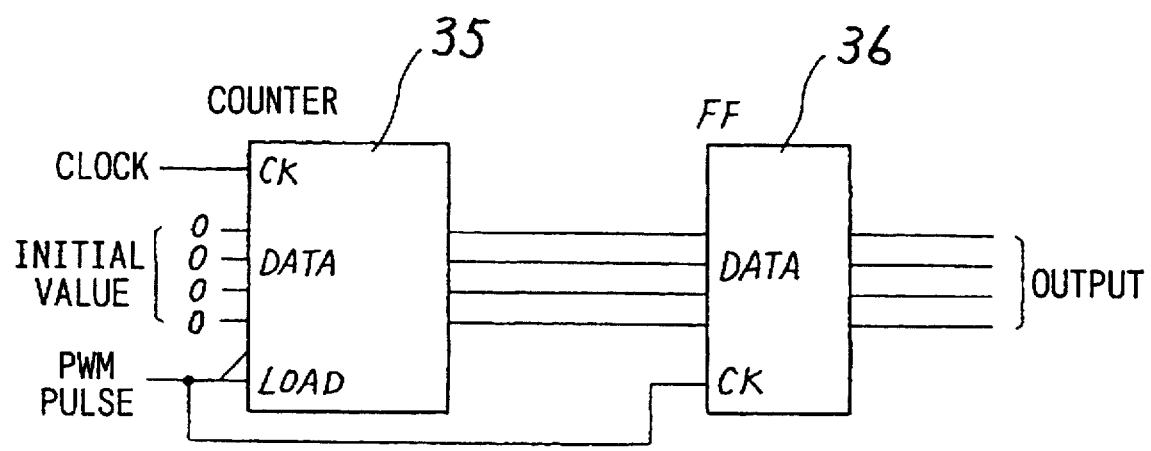
FIG. 7 is a diagram of assistance in explaining a pulse width detecting circuit of FIG. 3.
Figure 8:
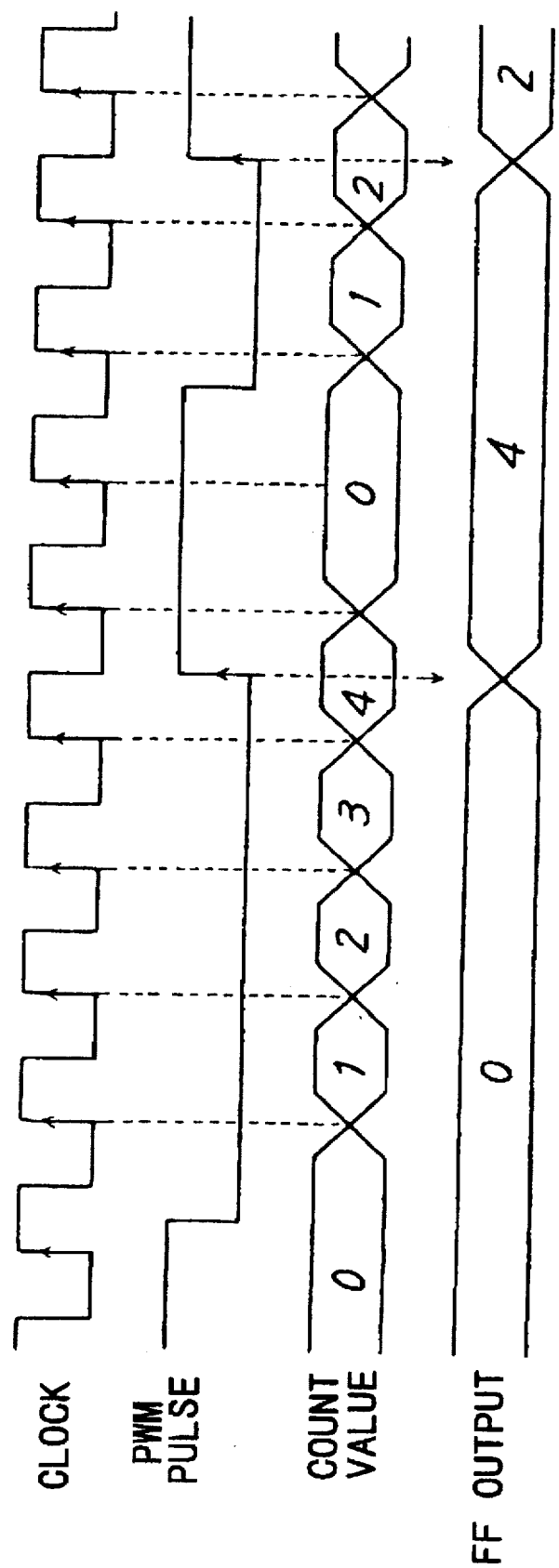
FIG. 8 is a time chart of the pulse width detecting circuit of FIG. 7.

FIG. 3 is a block diagram showing a first embodiment of the present invention. FIG. 4 is a circuit diagram showing a PWM pulse generating circuit of FIG. 3. FIG. 5 is an explanatory diagram of a current feedback PWM control circuit of FIG. 3. FIG. 6 is an explanatory diagram showing a PWM pulse of FIG. 4. FIG. 7 is a circuit diagram of a pulse width detection circuit of FIG. 3. FIG. 8 is a time chart of a pulse width detection circuit of FIG. 7.

As illustrated in FIG. 3, a driving circuit 21 includes four pieces of FETs (Field Effect Transistors) 21-1 to 21-4. The first and second FETs 21-1, 21-2 are connected in parallel to a power supply Vd. Inputted to the first FET 21-1 is an output A of the PWM (Pulse Width Modulation) pulse generation circuit 20. Inputted to the second FET 21-2 is an output B of the PWM pulse generation circuit 20.

The first and second FETs 21-1, 21-2 are switched ON with a low-level input. Then, diodes d1, d2 are connected in parallel to the first and second FETs 21-1, 21-2.

A third FET 21-3 is connected in series to the first FET 21-1. A fourth FET 21-4 is connected in series to the second FET 21-2. Inputted to the third FET 21-3 is an output A of the PWM pulse generating circuit 20. Inputted to the fourth FET 21-4 is an output B of the PWM pulse generating circuit 20.

The third and fourth FETs 21-3, 21-4 are switched ON with a high-level input. Then, diodes d3, d4 are connected in parallel to the third and fourth FETs 21-3, 21-4.

A coil L and a resistor r of VCM 14 are provided between the connecting point the first FET 21-1 and the third FET 21-3 and the connecting point the second FET 21-2 and the fourth FET 21-4. Note that a current sense resistor r2 converts a current flowing across the coil L into a voltage.

Accordingly, when the outputs A, B of the PWM pulse generating circuit 20 assume a high level, no current flows across a coil L. When the output A of the PWM pulse generating circuit 20 is at the low level, while the output B thereof is at the high level, the current directed as shown by an arrow F1 in the Figure flow across the coil L. Reversely when the output A of the PWM pulse generating circuit 20 is at the high level, while the output B thereof is at the low level, the current directed as shown by an arrow F2 in the Figure flow across the coil L.

A level shift circuit 22 works to level-shift a detected voltage value of a current sense resistor r2. Written from a control circuit 23 to a digital-to-analog converter 24 is a current indication value (target current value)/needed for pushing the optical head 13. Then, the D/A converter 24 converts this target current value into an analog quantity and inputs the analog quantity to a comparator 25.

A detected current quantity from the level shift circuit 22 is inputted to the other input terminal of the comparator 25. This comparator 25 compares the detected current quantity with a target current quantity. Then, the comparator 25, if the detected current quantity exceeds the target current quantity, generates an output pulse.

FIG. 5 is an operation explanatory diagram. As shown in FIG. 5, the PWM pulse generating circuit 20, when the output pulse is generated from the comparator 25, sets the two outputs A, B at the high level for a fixed time. No current thereby flows across the coil L of the VCM 14.

On the other hand, the PWM pulse generating circuit 20, when no output pulse is given from the comparator 25, sets the output pulse A or B at the low level as done before in accordance with a current direction indicating signal transmitted from the control circuit 23, thus switching a current direction to F1 or F2 control. Therefore, as described above, the first through fourth FETs 21-1 to 21-4 are switched ON/OFF.

Accordingly, it follows that substantially the power supply voltages Vd are applied on the both ends of the coil L of the VCM 14, with the result that the current flows in the arrowed direction F1 or F2. With this construction, the current feedback PWM drive control is actualized.

The PWM pulse generating circuit 20 has the construction as illustrated in FIG. 4. A timer value is down-loaded into a counter 30 in accordance with the output pulse of the comparator 25, and the counter 30 counts clocks. A carry output of the counter 30 is inverted by an inverter circuit 31 and then inputted to an enable terminal of the counter 30.

A first AND gate 32 takes AND of the carry output and the current direction indicating signal given from the control circuit 23. An inverter circuit 39 inverts an output of the first AND gate 32 and outputs a drive pulse A. An inverter circuit 33 inverts the current direction indicating signal. A second AND gate 34 takes AND of the carry output and the output of the inverter circuit 33. An inverter circuit 40 inverts an output of the second AND gate 34 and outputs the drive pulse B.

Accordingly, as shown in FIG. 6, a timer value is down-loaded into the counter 30 in accordance with the output pulse of the comparator 25, and the counter 30 counts the clocks. During a counting period of the timer value by the counter 30, the drive pulse A or B (PWM pulse) assumes the high level. No current thereby flows across the coil L.

On the other hand, the counter 30 finishes counting the timer value and generates the carry output, and, hereupon, the drive pulse A or B takes the low level. With this operation, the current set in the indicated direction flows across the coil L.

Accordingly, as explained referring to FIG. 5, the PWM pulse generating circuit 20 sets the drive pulses A and B at the high level for a fixed time in accordance with the output pulse of the comparator 25. The current thereby never flows across the coil L. Further, after the fixed time has elapsed, the PWM pulse generating circuit 20 sets the drive pulse A or B at the low level. The current thereby flows across the coil L.

The comparator 25, if the current value of the coil L exceeds an indicated current value, generates the output pulse, and therefore the application of the current to the coil L is stopped for a fixed time. Then, the application of the current to the coil L is started. Thus, the current feedback PWM control is carried out.

Referring back to FIG. 3, the control circuit 23 is constructed of a microprocessor. The control circuit 23 controls the drive of the VCM 14 and, for this purpose, transmits the current direction indicating signal to the PWM pulse generating circuit 20. The control circuit 23 also writes an indicated current value to D/A converter 24. Then, the control circuit 23 executes a push control process which will hereinafter be described referring to FIG. 9.

An OR circuit 26 takes OR of the drive pulses A and B of the PWM pulse generating circuit 20. A pulse width detecting circuit 27 detects pulse widths of the drive pulses A and B during the low-level period.

The pulse width detecting circuit 27 includes, as illustrated in FIG. 7, a counter 35 and a flip-flop 36. An initial value is down-loaded into the counter 35 with the PWM (drive) pulse serving as a download input, and the counter 35 counts the clocks. That is, as shown in FIG. 8, the counter 35 counts a low-level pulse width of the drive pulse.

The flip-flop 36 holds a count value (low-level pulse width) of the counter 35, wherein the PWM pulse serves as a clock.

Accordingly, as shown in FIG. 8, the counter 35 counts the width (low-level pulse width) of the PWM pulse (drive pulse). Then, a value of the pulse width is held by the flip-flop 36 and then outputted.

Figure 9:
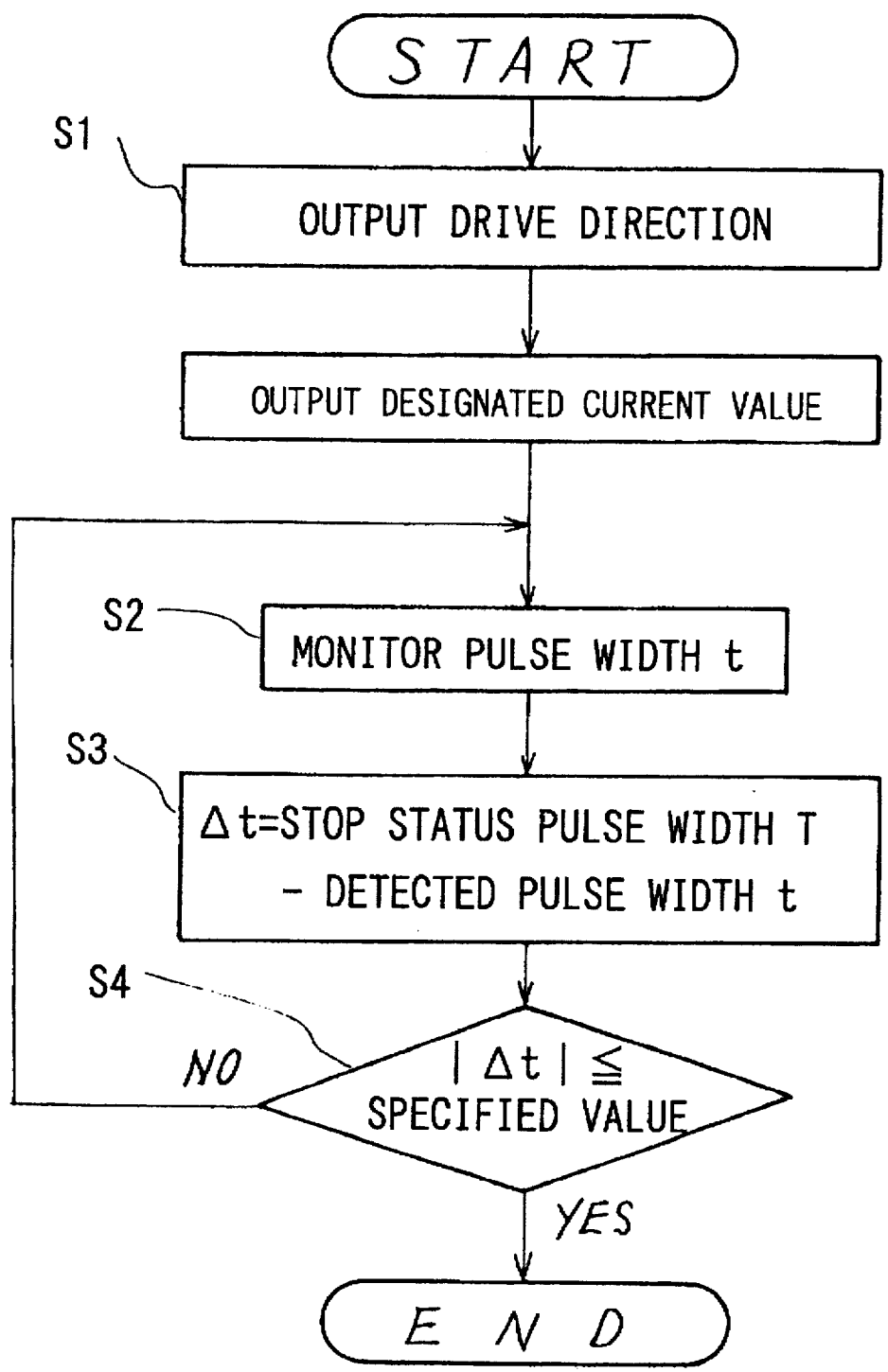
FIG. 9 is a processing flowchart in a first embodiment of the present invention.

FIG. 9 is a processing flowchart of in the first embodiment of the present invention, showing the pulse process of the optical head that is to be executed when controlling the light emission.

(S1) The control circuit 23 makes the PWM pulse generating circuit 20 generate such a current direction indicting signal that the optical head 13 moves toward the outer stopper 16. Then, the control circuit 23 writes the indicated current value to the D/A converter 24. With this processing, as explained referring to FIGS. 5 and 6, the current set in the current indicated direction flows across the coil L. The optical head 13 thereby moves toward the outer stopper 16.

(S2) The control circuit 23 monitors a detected pulse width t of the pulse width detecting circuit 27.

(S3) Next, the control circuit 23 subtracts the detected pulse width t from a pulse width T in a predetermined stop status, thereby obtaining a difference Δt.

(S4) Next, the control circuit 23 obtains an absolute value of the difference Δt. Then, the control circuit 23 checks whether or not this absolute value falls within a predetermined specified value. The control circuit 23, if the absolute value of the difference Δt falls within the specified value, judges that the optical head 13 stops and therefore finishes the processing. Reversely, the control circuit 23, if the absolute value of the difference Δt does not fall within the specified value, judges that the optical head 13 does not stop and therefore returns to step S2.

Figure 10:
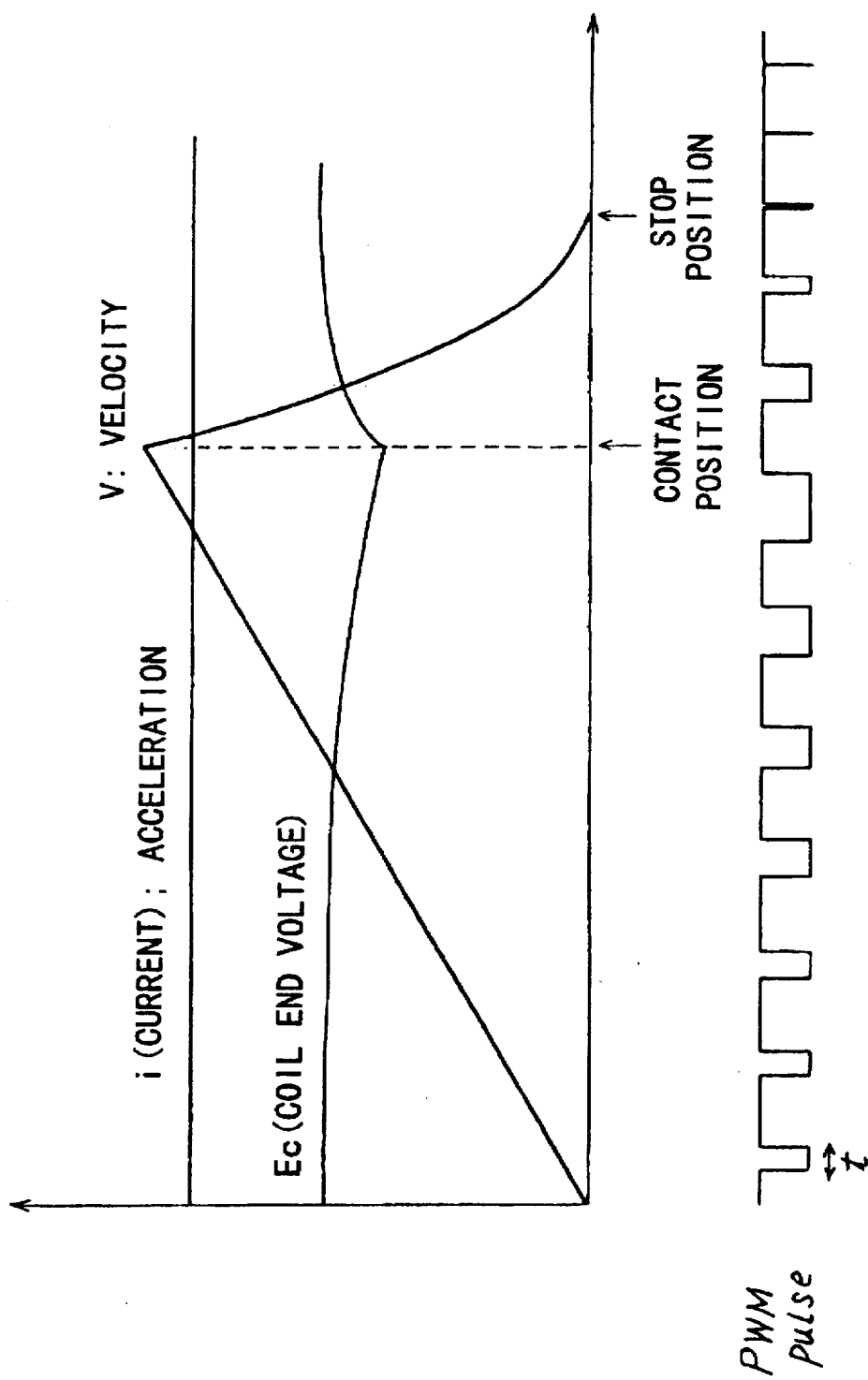
FIG. 10 is an operation explanatory diagram in the first embodiment of the present invention.

This operation will be explained with reference to FIG. 10.

A constant current is flowed into the VCM 14, whereby the optical head 13 makes a constant accelerating motion. A velocity v of the optical head 13 is thereby increased. Therefore, a counter electromotive voltage E, which will be expressed as follows, is to be generated at both ends of the coil L by dint of the velocity v.

$$E = B \cdot L \cdot v$$

A voltage Ec applied on both ends of the coil is thereby decreased as follows:

$$Ec = Vd - E$$

Hence, the current flowing across the coil L is reduced. On the other hand, the current feedback pulse width modulation circuit 20 executes the control so that the drive current becomes constant, and therefore the drive pulse width is increased.

When the optical head 13 impinges upon the stopper 16 and thus stops its motion, the velocity v is zeroed. The counter electromotive force E is thereby zeroed. Accordingly, the voltage Ec applied on both ends of the coil rises. Consequently, the drive pulse width t is narrowed. It is possible to confirm that the optical head 13 impinges upon the stopper and stops by monitoring the drive pulse width t.

That is, the control circuit 23 previously memorizes the drive pulse width T when Ec=Vd as a drive pulse width in the stop status. Then, the control circuit 23 takes a difference between the detected drive pulse width t and the drive pulse width T in the stop status, and, if this difference falls within a specified value, judges that the pushing operation is completed. That is, the control circuit 23 judges that the optical head 13 is pushed against the outer stopper 16 and then stops.

Thereafter, the control circuit 23 indicates a laser diode of the fixed unit of the unillustrated optical head to emit the laser beams and controls a light emission intensity from reflected laser beams thereof.

Thus, the control circuit 23 detects that the optical head 13 is pushed against the stopper by exploiting a variation in the drive pulse width that corresponds to the counter electromotive voltage induced in the coil L of the VCM 14. Therefore, the necessity for a positional sensor for detecting the optical head is eliminated. Accordingly, a reduction in terms of cost of the device and downsizing thereof are attainable.

Furthermore, the drive pulse width of the current feedback pulse width modulation circuit is monitored, and hence the device can be actualized at low costs with a simplicity.

Figure 11:
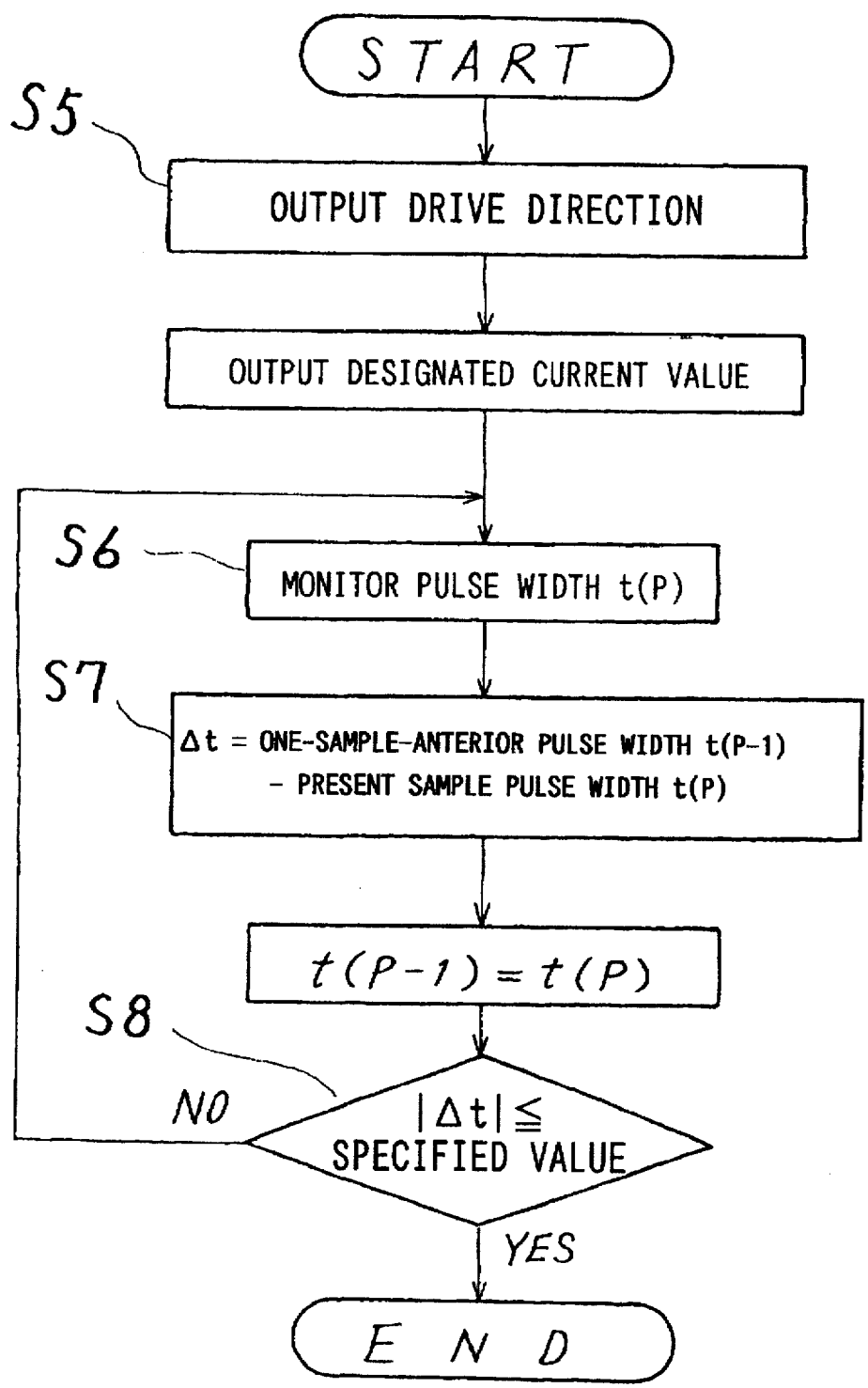
FIG. 11 is a processing flowchart in a second embodiment of the present invention.

FIG. 11 is a processing flowchart of a second embodiment of the present invention but shows the pushing process of the optical head that is executed when controlling the light emission.

In accordance with the second embodiment, the construction of the apparatus is the same as that shown in FIGS. 3 through 8.

(S5) The control circuit 23 makes the PWM pulse generating circuit 20 generate such a current direction indicating signal that the optical head 13 moves toward the outer stopper 16. Then, the control circuit 23 writes the indicated current value to the D/A converter 24. With this processing, as explained referring to FIGS. 5 and 6, the current set in the current indicated direction flows across the coil L. The optical head 13 thereby moves toward the outer stopper 16.

(S6) The control circuit 23 monitors a detected pulse width t (p) of the pulse width detecting circuit 27.

(S7) Next, the control circuit 23 subtracts the detected pulse width t (p) from a detected pulse width t(p−1) one sample before, thereby obtaining a difference Δt. Then, the control circuit 23 updates t(p−1) to t(p).

(S8) Next, the control circuit 23 obtains an absolute value of the difference Δt. Then, the control circuit 23 checks whether or not this absolute value falls within a predetermined specified value. The control circuit 23, if the absolute value of the difference Δt falls within the specified value, judges that the optical head 13 stops and therefore finishes the processing. Reversely, the control circuit 23, if the absolute value of the difference Δt does not fall within the specified value, judges that the optical head 13 does not stop and therefore returns to step S6.

The basic operations in the second embodiment are the same as those in the first embodiment. A difference from the first embodiment is that when the velocity v of the optical head 13 is zeroed, the voltage Ec applied on both ends of the coil L becomes substantially constant with respect to the power supply voltage Vd. Accordingly, no change in the pulse width can be seen, and therefore the stop status of the optical head 13 is confirmed by detecting this unchanged state.

Figure 12:
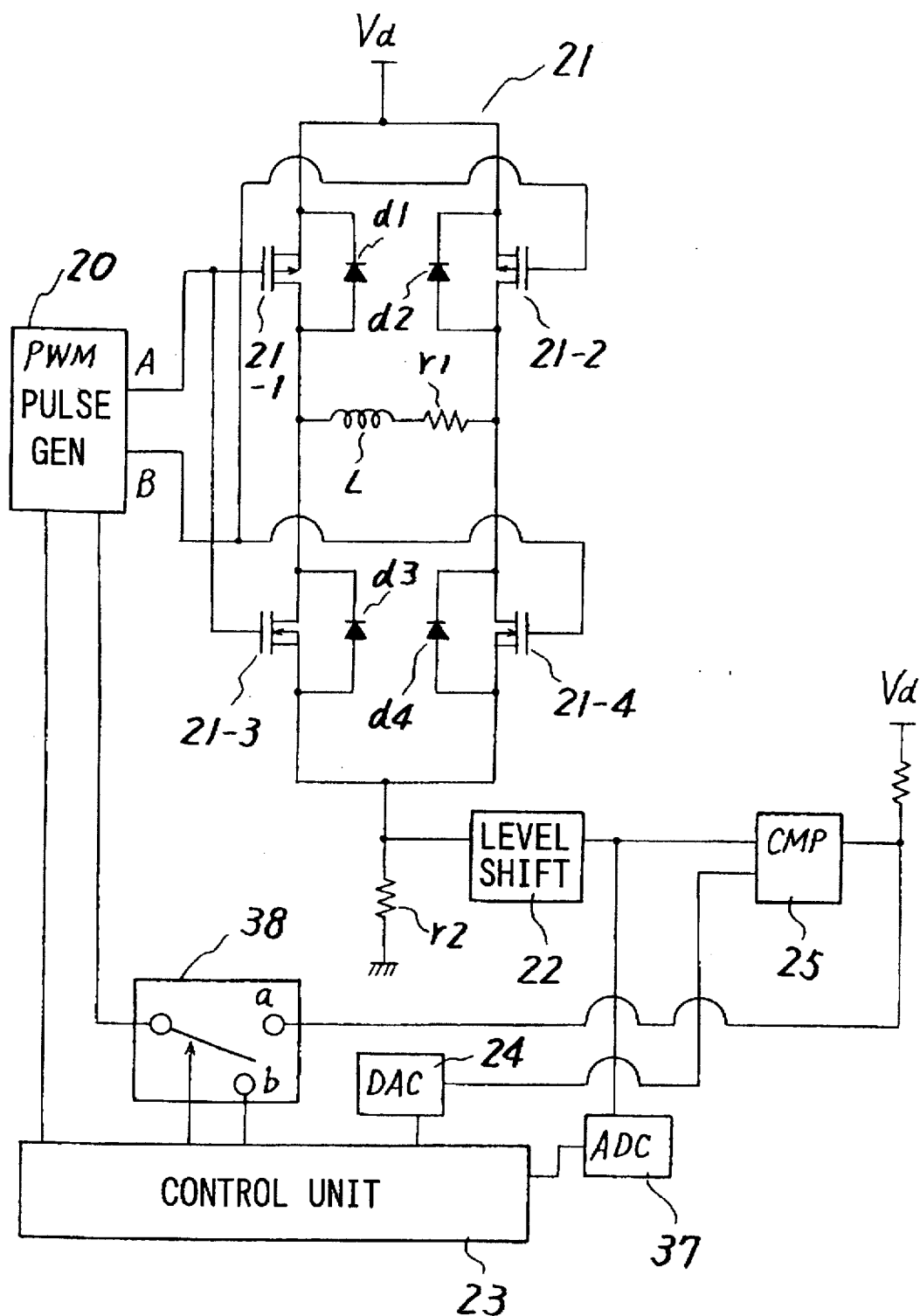
FIG. 12 is a block diagram showing a third embodiment of the present invention.

FIG. 12 is a block diagram in a third embodiment of the present invention. Referring to FIG. 12, the same elements as those shown in FIG. 3 are marked with the like symbols.

Referring to FIG. 12, the A/D converter 37 converts a detected current quantity of the level shift circuit 22 into a digital detected current value and outputs the converted current value to the control circuit 23. A switch 38 has two contact points a and b. The contact point a serves to give the output of the comparator 25 to the PWM pulse generating circuit 20. As in the first embodiment discussed above, the current feedback PWM control can be thereby actualized.

The contact point b serves to impart, to the PWM pulse generating circuit 20, a pseudo comparator output generated at a fixed interval and given from the control circuit 23. That is, it operates as a voltage drive PWM control circuit. This switch 38 is switched over according to an indication of the control circuit 23. The pseudo comparator output is inputted to a load terminal of the counter 30 shown in FIG. 4.

Figure 13:
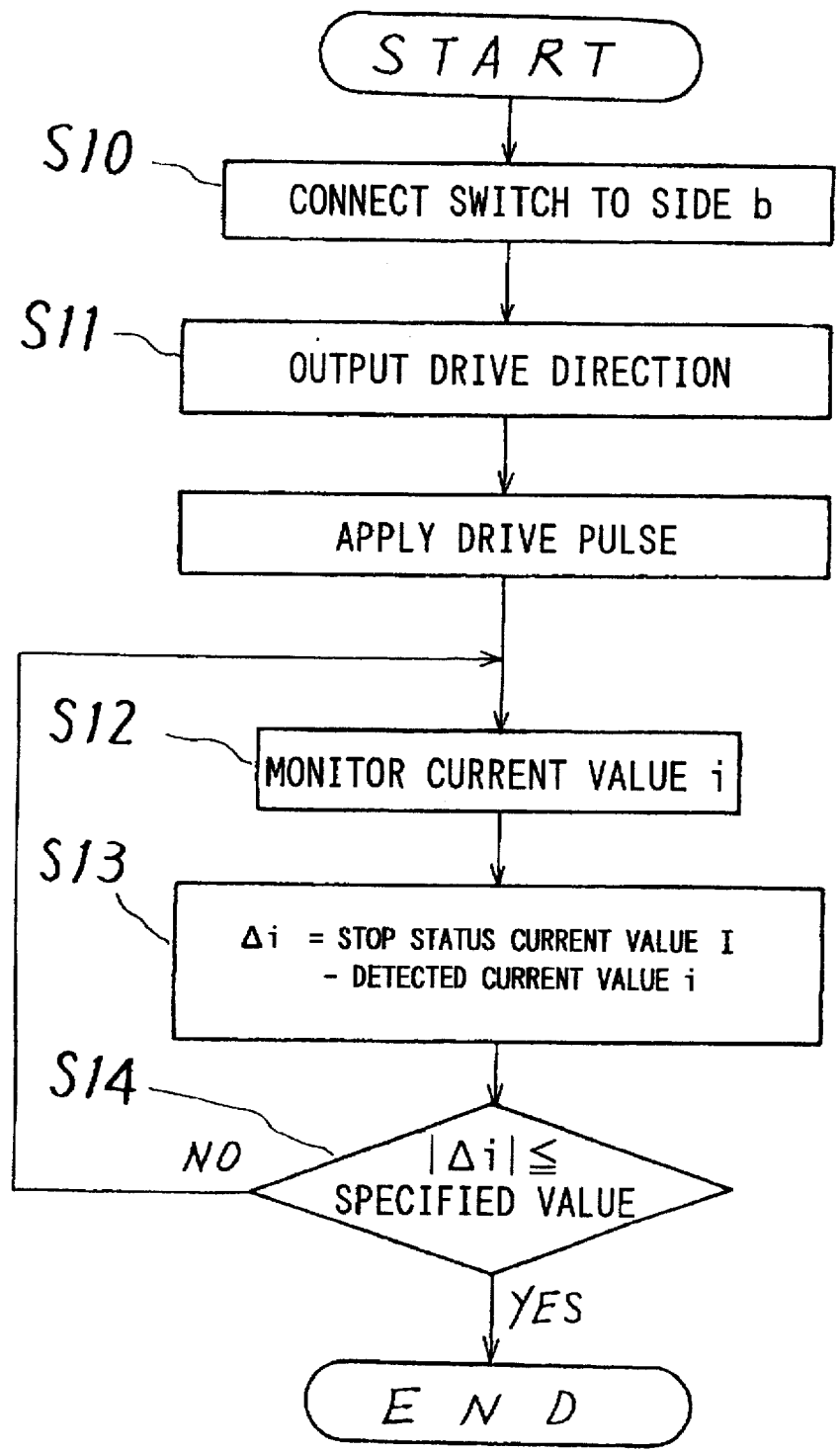
FIG. 13 is a processing flowchart in the third embodiment of the present invention.

FIG. 13 is a processing flowchart in the third embodiment of the present invention but shows a pushing process of the optical head that is executed when controlling the light emission.

(S10) The control circuit 23, when the optical head 13 normally moves, connects the switch 38 to a side a. As described above, the current feedback PWM control is thereby performed. While, when the pushing operation of the optical head 13 is performed, the control circuit 23 connects the switch 38 to a side b.

(S11) The control circuit 23 makes the PWM pulse generating circuit 20 generate such a current direction indicting signal that the optical head 13 moves toward the outer stopper 16. Then, the control circuit 23 imparts, to the PWM pulse generating circuit 20, a pseudo comparator pulse (drive pulse) generated at a fixed interval via the switch 38. The drive pulse having a fixed width is thereby always generated as explained with reference to FIGS. 5 and 6, and the current set in the current indicated direction flows across the coil L. Therefore, the optical head 13 moves toward the outer stopper 16.

(S12) The control circuit 23 monitors a detected current value i of the A/D converter 37.

(S13) Next, the control circuit 23 subtracts the current value i from a current value I in a predetermined stop status, thereby obtaining a difference Δi.

(S14) Subsequently, the control circuit 23 obtains an absolute value of the difference Δi. Then, the control circuit 23 checks whether or not this absolute value falls within a predetermined specified value. The control circuit 23, if the absolute value of the difference Δi falls within the specified value, judges that the optical head 13 stops and therefore finishes the processing. Reversely, the control circuit 23, if the absolute value of the difference Δi does not fall within the specified value, judges that the optical head 13 does not stop and therefore returns to step S12.

Figure 14:
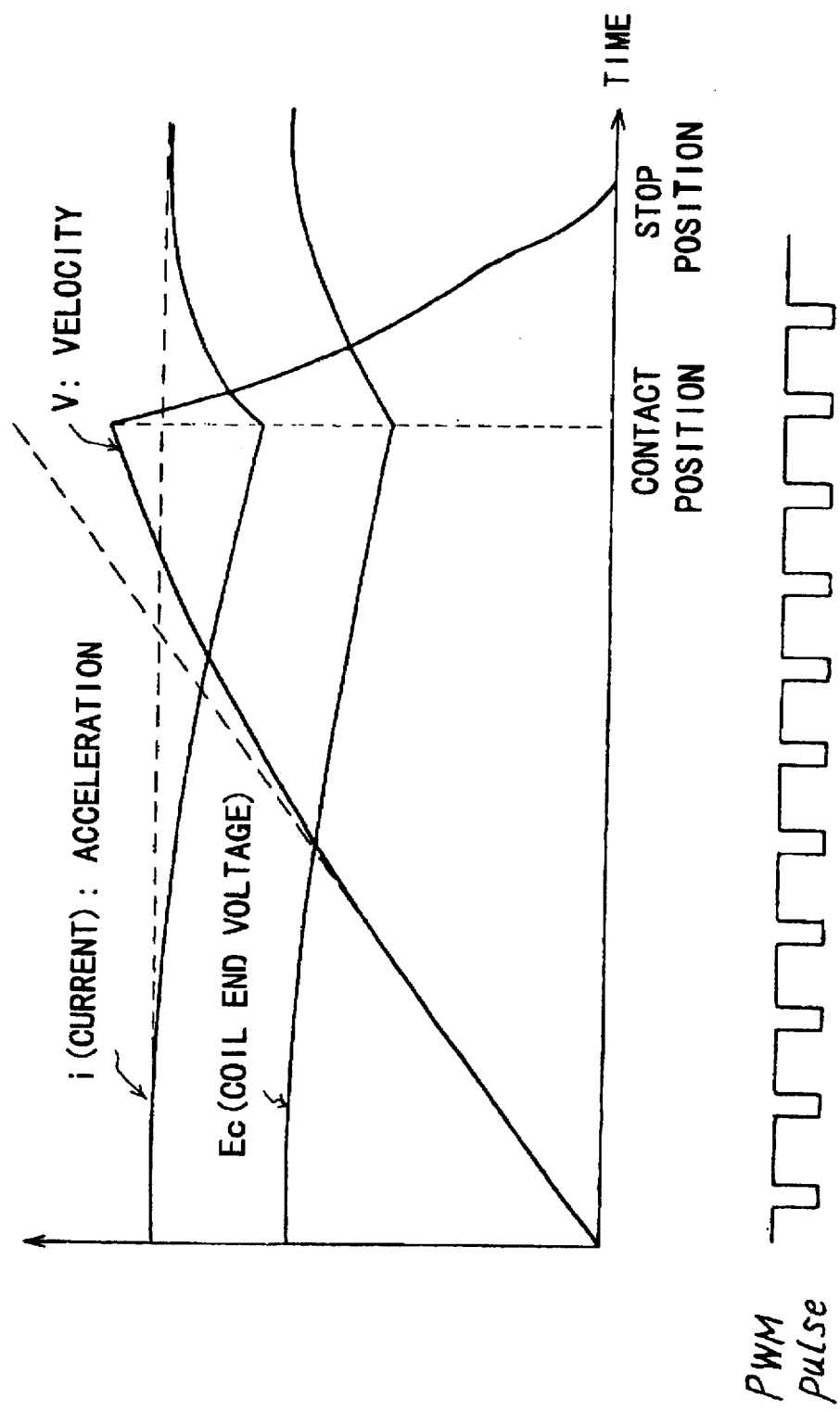
FIG. 14 is an operation explanatory diagram in the third embodiment of the present invention.

This operation will be explained with reference to FIG. 14. A drive signal (pseudo comparator signal) having a fixed pulse with is given from the control circuit 23. The pulse width modulation circuit 20 thereby turns out to be a voltage drive pulse width modulation circuit. Accordingly, the PWM pulse generating circuit 20 outputs the drive pulse having the fixed width.

The optical head 13 is thereby moved. The counter electromotive voltage E, which will be expressed as follows, is to be generated at both ends of the coil by dint of the velocity v.

$$E=B \cdot L \cdot v$$

A voltage Ec applied on both ends of the coil is thereby decreased as follows:

$$Ec=Vd-E$$

Hence, the current i flowing across the coil L is reduced.

When the optical head 13 impinges upon the stopper 16 and thus stops its motion, the velocity v is zeroed. The counter electromotive force E is thereby zeroed, and the voltage Ec applied on both ends of the coil rises. Therefore, the current i flowing across the coil increases. It is possible to confirm that the optical head 13 impinges upon the stopper and stops by monitoring the current value i of the current flowing across the coil.

That is, the control circuit 23 previously memorizes the current value I when the voltage Ec at both ends of the coil is equal to the power supply voltage Vd. Then, just when the difference $\Delta i$ between this current value I and the detected current value i is smaller than the specified value, the pushing operation is completed. That is, just when the current value I is substantially equal to the detected current value i, the completion of the pushing operation is detected.

Thus, the control circuit 23 detects that the optical head 13 is pushed against the stopper by exploiting a variation in the current value that corresponds to the counter electromotive voltage induced in the coil L of the VCM 14. Therefore, the necessity for the positional sensor for detecting the optical head is eliminated. Accordingly, the reduction in terms of cost of the device and downsizing thereof are attainable.

Figure 15:
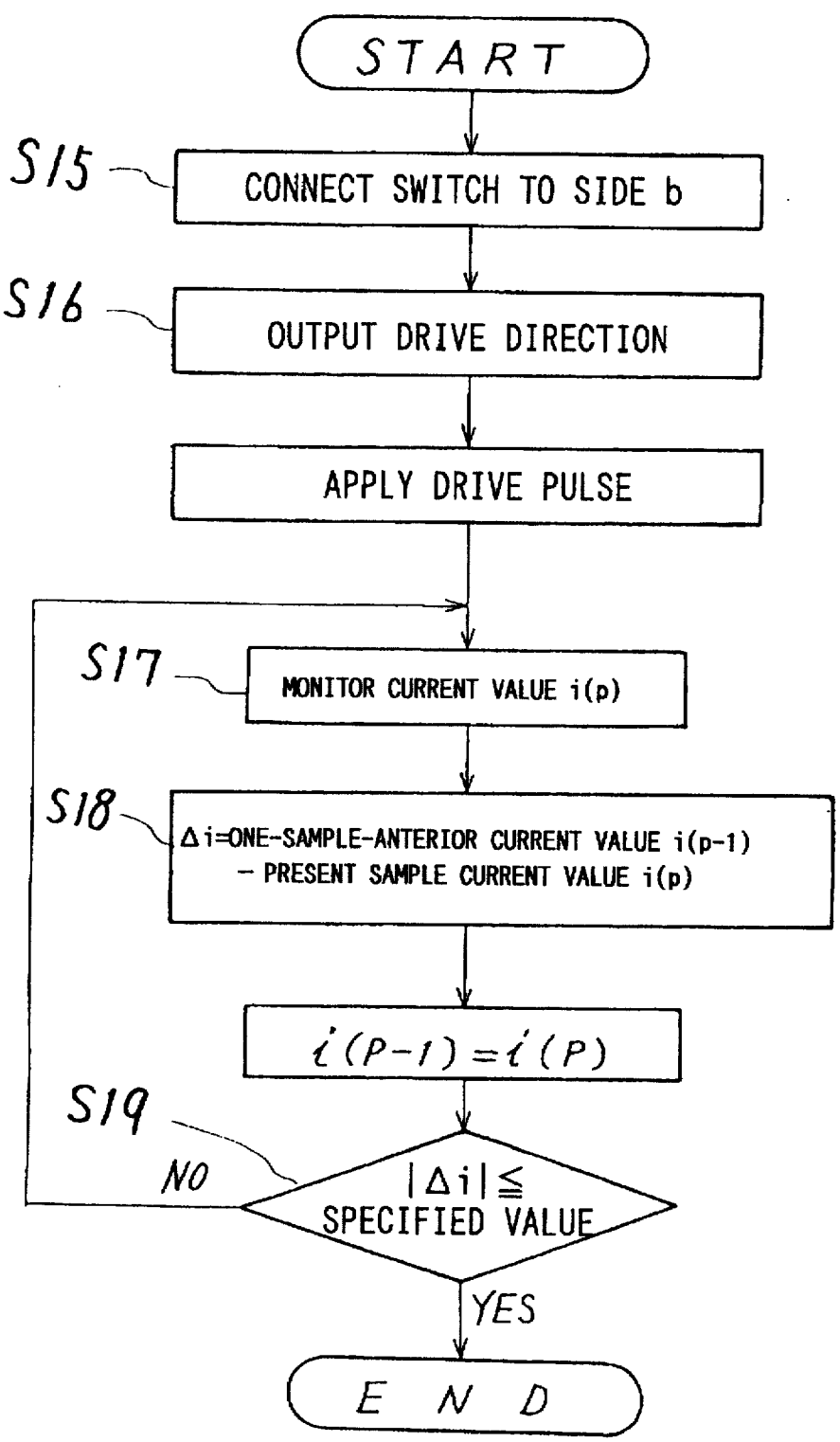
FIG. 15 is a processing flowchart in a fourth embodiment.
Figure 16:
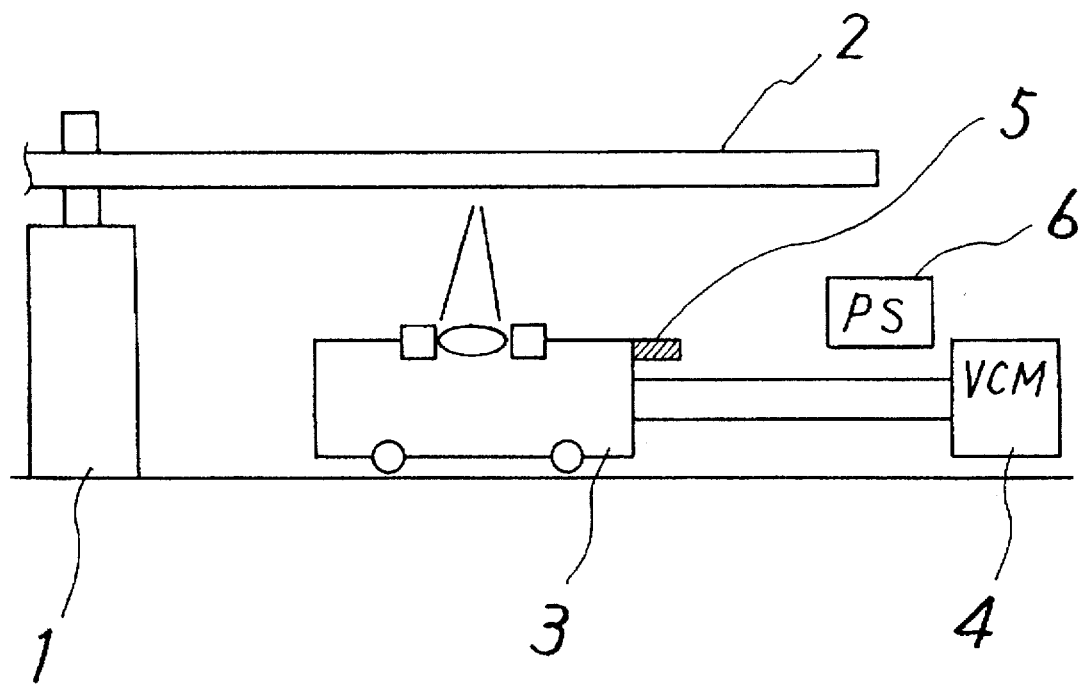
FIG. 16 is an explanatory diagram showing a prior art.

FIG. 15 is a processing flowchart of a fourth embodiment of the present invention but shows the pushing process of the optical head that is executed when controlling the light emission. The fourth embodiment involves the use of a construction shown in a block diagram of FIG. 13.

(S15) The control circuit 23, when the optical head 13 normally moves, connects the switch 38 to the side a. As described above, the current feedback PWM control is thereby performed. While, when the pushing operation of the optical head 13 is performed, the control circuit 23 connects the switch 38 to the side b.

(S16) The control circuit 23 makes the PWM pulse generating circuit 20 generate such a current direction indicating signal that the optical head 13 moves toward the outer stopper 16. Then, the control circuit 23 imparts, to the PWM pulse generating circuit 20, the pseudo comparator pulse (drive pulse) generated at a fixed interval via the switch 38. The drive pulse having a fixed width is thereby always generated as explained with reference to FIGS. 5 and 6, and the current set in the current indicated direction flows across the coil L. Therefore, the optical head 13 moves toward the outer stopper 16.

(S17) The control circuit 23 monitors the detected current value i (p) of the A/D converter 37.

(S18) Next, the control circuit 23 subtracts the detected current value i (p) from a detected current value i(p−1) one sample before, thereby obtaining a difference $\Delta i$. Then, the control circuit 23 updates i(p−1) to i(p).

(S19) Subsequently, the control circuit 23 obtains an absolute value of the difference $\Delta i$. Then, the control circuit 23 checks whether or not this absolute value falls within a predetermined specified value. The control circuit 23, if the absolute value of the difference $\Delta i$ falls within the specified value, judges that the optical head 13 stops and therefore finishes the processing. Reversely, the control circuit 23, if the absolute value of the difference $\Delta i$ does not fall within the specified value, judges that the optical head 13 does not stop and therefore returns to step S17.

The basic operations in the fourth embodiment are the same as those in the third embodiment. A difference from the third embodiment is that when the velocity v of the optical head 13 is zeroed, the voltage Ec applied on both ends of the coil L becomes substantially uniform with respect to the power supply voltage Vd. Accordingly, no change in the current value can be seen, and therefore the stop status of the optical head 13 is confirmed by detecting this unchanged state.

In addition to the embodiments discussed above, the present invention may take the following modifications. First, the PWM modulation has been explained in such a manner that the period is made variable, while the high-level period is fixed. However, the period may be fixed, while the high-level period may be made variable.

Second, the optical disk has been exemplified by way of an optical storage medium, but an optical card and other mediums are also available.

The present invention has been discussed by way of the embodiments so far. A variety of modification may, however, be possible within the scope of purport of the present invention but are not excluded from the range of the present invention.

As discussed above, according to the present invention, in the current feedback PWM modulation, the variation in the drive pulse width due to the change in the counter electromotive voltage is detected by flowing the constant current, and it is therefore possible to detect that the optical head reaches the predetermined position by using no positional sensor.

Further, the variation in the current value due to the change in the counter electromotive voltage is detected by applying the drive pulse having the fixed width on the basis of the voltage drive PWM modulation, and it is therefore feasible to detect that the optical head reaches the predetermined position by using no positional sensor. Hence, the reduction in the cost of the device and the downsizing thereof can be attained.

What is claimed is:

1. An optical storage apparatus for confirming that an optical head for reading data on an optical storage medium reaches a predetermined position, said optical storage apparatus comprising:

a stopper provided in the predetermined position;

moving means for moving said optical head in such a direction as to traverse a track on said optical storage medium;

a drive circuit for driving said moving means;

a pulse width modulation circuit for comparing a value of current flowing across said drive circuit with a current indicating value and modulating a width of the drive pulse given to said drive circuit in accordance with a compared result; and a control circuit for giving the current indicating value to said pulse width modulation circuit, monitoring the width of the drive pulse, and confirming that said optical head impinges upon said stopper and stops by monitoring said width of the drive pulse.

2. An optical storage apparatus according to claim 1, wherein said control circuit compares the width of the drive pulse with a predetermined drive pulse width and confirms that said optical head impinges upon said stopper by compared result.

3. An optical storage apparatus according to claim 2, wherein said control circuit subtracts the predetermined drive pulse width from the drive pulse width, checks whether or not a difference therebetween is smaller than a predetermined value, and confirms that said optical head impinges upon said stopper by said check.

4. An optical storage apparatus according to claim 1, wherein said control circuit detects that the drive pulse width becomes substantially uniform and confirms that said optical head impinges upon said stopper by said detection.

5. An optical storage apparatus according to claim 4, wherein said control circuit detects the drive pulse width at an interval of a fixed time, calculates a difference between the drive pulse width detected this time and the drive pulse width detected last time and, if the difference is smaller than a predetermined value, confirms that said optical head impinges upon said stopper.

6. An optical storage apparatus according to claim 1, further comprising:

a pulse width detecting circuit for converting the drive pulse into a value of the drive pulse width and outputting the thus converted pulse width value to said control circuit.

7. An optical storage apparatus according to claim 1, wherein said stopper is provided in a predetermined position in which said optical head is located for adjusting a quantity of light emission of said optical head.

8. An optical storage apparatus according to claim 7, wherein said control circuit adjustably controls the quantity of light emission of said optical head after confirming that said optical head impinges upon said stopper.

9. An optical storage apparatus for confirming that an optical head for reading data on an optical storage medium reaches a predetermined position, said optical storage device comprising:

a stopper provided in the predetermined position;

moving means for moving said optical head in such a direction as to traverse a track on said optical storage medium;

a drive circuit for driving said moving means;

a comparing circuit for comparing a value of current flowing across said drive circuit with a current indicating value;

a pulse width modulation circuit for modulating a width of the drive pulse given to said drive circuit in accordance with a control signal;

a switch circuit for switching an input of the control signal to said pulse width modulation circuit over to an output of said comparing circuit and a drive signal; and a control circuit for switch-controlling said switch circuit, giving the drive signal by which said pulse width modulation circuit outputs the drive pulse having a fixed pulse width, monitoring the value of current flowing across said drive circuit, and confirming that said optical head impinges upon said stopper and stops by monitoring the value of current.

10. An optical storage apparatus according to claim 9, wherein said control circuit compares a value of current flowing across said drive circuit with a predetermined current value and confirms that said optical head impinges upon said stopper by comparing result.

11. An optical storage apparatus according to claim 10, wherein said control circuit subtracts the predetermined current value from the detected current value, checks whether or not a difference therebetween is smaller than a predetermined value, and confirms that said optical head impinges upon said stopper by said check.

12. An optical storage apparatus according to claim 9, wherein said control circuit detects that the value of current flowing across said drive circuit becomes substantially a fixed value and confirms that said optical head impinges upon said stopper by said detection.

13. An optical storage apparatus according to claim 12, wherein said control circuit detects the current value at an interval of a fixed time, calculates a difference between the current value detected this time and the current value detected last time and, if the difference is smaller than a predetermined value, confirms that said optical head impinges upon said stopper.

14. An optical storage apparatus according to claim 9, wherein said stopper is provided in a predetermined position in which said optical head is located for adjusting a quantity of light emission of said optical head.

15. An optical storage apparatus according to claim 14, wherein said control circuit adjustable controls the quantity of light emission of said optical head after confirming that said optical head impinges upon said stopper.

* * * * *